(12) United States Patent
Singhal et al.

(10) Patent No.: US 12,443,890 B2
(45) Date of Patent: Oct. 14, 2025

(54) PARTIALLY LOCAL FEDERATED LEARNING

(71) Applicant: Google LLC, Mountain View, CA (US)

(72) Inventors: Karan Singhal, Roslyn, NY (US); Hakim Sidahmed, Jr., Redmond, WA (US); Zachary A. Garrett, Seattle, WA (US); Shanshan Wu, Seattle, WA (US); John Keith Rush, Seattle, WA (US); Sushant Prakash, Marblehead, MA (US)

(73) Assignee: Google LLC, Mountain View, CA (US)

( * ) Notice: Subject to any disclaimer, the term of this patent is extended or adjusted under 35 U.S.C. 154(b) by 1069 days.

(21) Appl. No.: 17/332,893

(22) Filed: May 27, 2021

(65) Prior Publication Data

US 2022/0398500 A1     Dec. 15, 2022

(51) Int. Cl.
*G06N 20/20*        (2019.01)
(52) U.S. Cl.
CPC .................................. *G06N 20/20* (2019.01)
(58) Field of Classification Search
CPC ..................................................... G06N 20/20
See application file for complete search history.

(56) References Cited

PUBLICATIONS

Paul Pu Liang, "Think Locally, Act Globally: Federated Learning with Local and Global Representations", 2020 (Year: 2020).*

Ammad-Ud-Din et al., "Federated collaborative filtering for privacy-preserving personalized recommendation system," Information Retrieval, arXiv preprint arXiv:1901.09888, Jan. 2019, 12 pages.
Arivazhagan et al., "Federated learning with personalization layers," Machine Learning, arXiv preprint arXiv:1912.00818, Dec. 2019, 13 pages.
Bonawitz et al., "Towards federated learning at scale: System design," Proceedings of the 2nd SysML Conference 2019, arXiv preprint arXiv:1902.01046, Feb. 2019, 15 pages.
Chai et al., "Secure federated matrix factorization," IEEE Intelligent Systems, Aug. 2020, 7 pages.
Chen et al., "Federated meta-learning with fast convergence and efficient communication," Huawei Noah's Ark Lab, arXiv preprint arXiv:1802.07876, Feb. 2018, 14 pages.

(Continued)

*Primary Examiner* — Van C Mang
(74) *Attorney, Agent, or Firm* — Fish & Richardson P.C.

(57) ABSTRACT

Methods, systems, and apparatus, including computer programs encoded on computer storage media, for training a machine learning model having a set of local model parameters and a set of global model parameters under a partially local federated learning framework. One of the methods include maintaining local data and data defining the local model parameters; receiving data defining current values of the global model parameters; determining, based on the local data, the local model parameters, and the current values of the global model parameters, current values of the local model parameters; determining, based on the local data, the current values of the local model parameters, and the current values of the global model parameters, updated values of the global model parameters; generating, based on the updated values of the global model parameters, parameter update data defining an update to the global model parameters; and transmitting the parameter update data.

25 Claims, 4 Drawing Sheets

(56) References Cited

PUBLICATIONS

Deng et al., "Adaptive personalized federated learning," Pennsylvania State University, arXiv preprint arXiv:2003.13461, Mar. 2020, 50 pages.
Developer.Apple.com [online], "Designing for privacy," 2019, retrieved on Jan. 13, 2021, retrieved from URL<https://developer.apple.com/videos/play/wwdc2019/708>, 13 pages.
Developer.nvidia.com [online], "NVIDIA Clara: An Application Framework Optimized For Healthcare & Life Sciences Developers," Mar. 2019, retrieved on Jun. 4, 2021, retrieved from URL<https://developer.nvidia.com/clara>, 4 pages.
Diao et al., "HeteroFL: Computation and communication efficient federated learning for heterogeneous clients," Published as a Conference Paper at ICLR 2021, arXiv preprint arXiv:2010.01264, Oct. 2020, 24 pages.
Dinh et al., Personalized federated learning with Moreau envelopes, University of Sydney, Australia, arXiv preprint arXiv:2006.08848, Jun. 2020, 23 pages.
Doc.ai [online], "The Federated Future is ready for shipping," Mar. 2019, retrieved on Jun. 4, 2021, retrieved from URL<https://doc.ai/blog/the-federated-future-is-ready-for-shipping>, 6 pages.
Fallahv et al., "Personalized federated learning: A meta-learning approach," Department of Electrical Engineering and Computer Science, Massachusetts Institute of Technology, arXiv preprint arXiv:2002.07948, Feb. 2020, 29 pages.
Finn et al., "Model-agnostic meta-learning for fast adaptation of deep networks," International Conference on Machine Learning, Jul. 2017, 10 pages.
Flanagan et al., "Federated multi-view matrix factorization for personalized recommendations," Helsinki Research Center, arXiv preprint arXiv:2004.04256, Apr. 2020, 16 pages.
Gao et al., "Privacy Threats Against Federated Matrix Factorization," Cryptography and Security, arXiv preprint arXiv:2007.01587, Jul. 2020, 6 pages.
Gunawardana et al., "Convergence Theorems for Generalized Alternating Minimization Procedures," Journal of Machine Learning Research, Dec. 2005, 25 pages.
Hanzely et al., "Federated learning of a mixture of global and local models," King Abdullah University of Science and Technology Thuwal, Saudi Arabia, arXiv preprint arXiv:2002.05516, Feb. 2020, 40 pages.
Hard et al., "Federated learning for mobile keyboard prediction," Computation and Language, arXiv preprint arXiv:1811.03604, Nov. 2018, 7 pages.
Harper et al., "The movielens datasets: History and context," Acm Transactions on Interactive Intelligent Systems (tiis), Dec. 2015, 19 pages.
Jain et al., "Low-rank matrix completion using alternating minimization," Proceedings of the Forty-Fifth Annual ACM Symposium on Theory of Computing, Jun. 2013, 40 pages.
Jiang et al., "Improving federated learning personalization via model agnostic meta learning" Machine Learning, arXiv preprint arXiv:1909.12488, Sep. 2019, 11 pages.
Kairouz et al., "Advances and open problems in federated learning," Machine Learning, arXiv preprint arXiv:1912.04977, Dec. 2019, 121 pages.
Khodak et al., "Adaptive gradient-based meta-learning methods," Machine Learning, arXiv preprint arXiv:1906.02717, Jun. 2019, 42 pages.
Koren et al., "Matrix factorization techniques for recommender systems," Computer, Aug. 2009, 8 pages.
Liang et al., "Think locally, act globally: Federated learning with local and global representations," Machine Learning, arXiv preprint arXiv:2001.01523, Jan. 2020, 34 pages.
Lin et al., "Meta Matrix Factorization for Federated Rating Predictions," Proceedings of the 43rd International ACM SIGIR Conference on Research and Development in Information Retrieval, Jul. 2020, 10 pages.
Mansour et al., "Three approaches for personalization with applications to federated learning," Machine Learning, arXiv preprint arXiv:2002.10619, Feb. 2020, 26 pages.
McMahan et al., "Communication-efficient learning of deep networks from decentralized data," Artificial Intelligence and Statistics, Apr. 2017, 10 pages.
Nichol et al., "On first-order meta-learning algorithms," OpenAI, arXiv preprint arXiv:1803.02999, Mar. 2018, 15 pages.
Nikolaenko et al., "Privacy-preserving matrix factorization," Proceedings of the 2013 ACM SIGSAC Conference on Computer & Communications Security, Nov. 2013, 12 pages.
Reddi et al., "Adaptive federated optimization," Machine Learning, arXiv preprint arXiv:2003.00295, Feb. 2020, 40 pages.
TensorFlow.com [online], "Tensorflow Federated Stack Overflow Dataset," 2019, retrieved on Jun. 4, 2021, retrieved from URL<https://www.tensorflow.org/federated/api_docs/python/tff/simulation/datasets/stackoverflow/load_data?hl=id>, 2 pages.
TensorFlow.com [online], "TensorFlow Federated: Machine Learning on Decentralized Data," 2019, retrieved on Jun. 4, 2021, retrieved from URL< https://www.tensorflow.org/federated>, 5 pages.
Wang et al., "Federated evaluation of on-device personalization," Machine Learning, arXiv preprint arXiv:1910.10252, Oct. 2019, 6 pages.
Weinberger et al., "Feature hashing for large scale multitask learning, " Proceedings of the 26th Annual International Conference on Machine Learning, Jun. 2009, 10 pages.
Yang et al., "Applied federated learning: Improving google keyboard query suggestions," Machine Learning, arXiv preprint arXiv:1812.02903, Dec. 2018, 9 pages.
Yu et al., "Salvaging federated learning by local adaptation," Machine Learning, arXiv preprint arXiv:2002.04758, Feb. 2020, 10 pages.

* cited by examiner

PARTIALLY LOCAL FEDERATED LEARNING

BACKGROUND

This specification relates to training machine learning models.

A machine learning model receives an input and generate an output, e.g., a predicted output, based on the received input. Some machine learning models are parametric models and generate the output based on the received input and on values of the parameters of the model.

Some machine learning models are deep models that employ multiple layers of linear or non-linear operations to generate an output for a received input. For example, a deep neural network is a deep machine learning model that includes an output layer and one or more hidden layers that each apply a non-linear transformation to a received input to generate an output.

Some machine learning models can be trained using federated learning training. Federated learning is a machine learning setting where a global model is trained across training data distributed over a number of participating clients that keep their training data locally.

SUMMARY

This specification describes a global training system implemented as computer programs on one or more computers in one or more locations, and local training systems implemented on user devices, that can collaboratively train a machine learning model in a manner that respects user privacy. The machine learning model has a set of global parameters maintained at the global training system and multiple sets of local parameters maintained across the local training systems.

In general, one innovative aspect of the subject matter described in this specification can be embodied in methods performed by a client computing device that is in data communication with a server computing device over a data communication network that include the actions of maintaining local data and data defining a set of local parameters of a machine learning model, wherein the local data is a proper subset of a plurality of proper subsets of data that are used to train the machine learning model, each proper subset of data maintained on a separate client computing device, and is used to train the machine learning model only on the client computing device on which the proper subset is maintained; receiving, from the server computing device, data defining current values of a set of global parameters of the machine learning model over the data communication network; determining, based on the local data, the set of local parameters, and the current values of the set of global parameters, current values of a set of local parameters of the machine learning model, the current values of the set local parameters being different from the current values of the global parameters; determining, based on the local data, the current values of the set of local parameters, and the current values of the set of global parameters, updated values of the set of global parameters of the machine learning model; generating, based on the updated values of the set of global parameters, parameter update data defining an update to the set of global parameters of the machine learning model; and transmitting, to the server computing device, the parameter update data over the data communication network. maintaining local data further comprises partitioning the local data into a support dataset and a query dataset in accordance with a dataset split function.

Determining the current values of the set of local parameters of the machine learning model may comprise: providing the support dataset, the set of local parameters, and the data defining the current values of the set of global parameters as input to a reconstruction algorithm.

Determining the current values of the set of local parameters of the machine learning model may further comprise: determining initialized values of the set of local parameters; and performing one or more steps of gradient descent on the initialized values of the set of local parameters using the support dataset in accordance with a reconstruction learning rate $\eta_r$.

Determining the updated values of the set of local parameters of the machine learning model may comprise: providing the query dataset, data defining the current values of the set of local parameters, and the data defining the current values of the set of global parameters as input to an update algorithm.

Determining the updated values of the set of local parameters of the machine learning model may further comprise: performing one or more steps of gradient descent on the current values of the set of global parameters using the query dataset in accordance with a client update learning rate $\eta_u$.

Generating the parameter update data may further comprise generating a weighting factor to be associated with the update to the set of global parameters based on a size of the local data.

The methods may further comprise generating a local instance of the machine learning model from trained values of the sets of global and local parameters of the machine learning model; and using the local instance of the machine learning model to perform a machine learning task locally at the client computing device.

Another innovative aspect of the subject matter described in this specification can be embodied in methods performed by a server computing device that is in data communication with a plurality of client computing devices over a data communication network that include the actions of selecting a subset of client computing devices from the plurality of client computing devices; transmitting, to each client computing device in the subset and over the data communication network, data defining current values of a set of global parameters of a machine learning model, wherein the machine learning model has the set of global parameters maintained at the server computing device and a plurality of sets of local parameters maintained at the plurality of the client computing devices; receiving, from each client computing device in the subset and over the data communication network, respective parameter update data defining an update to the set of global parameters of the machine learning model; and updating the current values of the set of global parameters of the machine learning model based on the respective parameter update data.

Updating the current values of the set of global parameters of the machine learning model may comprise: combining the updates to the set of global parameters of the machine learning model in accordance with weighting factors defined the respective parameter update data.

Updating the current values of the set of global parameters of the machine learning model may comprise: combining only the updates to the set of global parameters of the machine learning model received from client computing devices that each maintain more than a threshold amount of local data.

Updating the current values of the set of global parameters of the machine learning model may comprise: determining an update to the current values of the set of global parameters in accordance with a server learning rate $\eta_s$.

Other embodiments of this aspect include corresponding systems, apparatus, and computer programs, configured to perform the actions of the methods, encoded on computer storage devices.

The subject matter described in this specification can be implemented in particular embodiments so as to realize one or more of the following advantages.

The techniques described in this specification can train a machine learning model in a manner that respects user privacy by implementing a partially local federated learning framework, i.e., a framework that can train a machine learning model using both federated training and local training techniques. The disclosed framework is a model-agnostic framework for partially local federated learning suitable for training, inference, or both at scale.

Federated training has traditionally been used to train the machine learning model across multiple user devices and on large amounts of training data generated locally by the user devices. Therefore, the machine learning model can be trained to achieve greater prediction accuracy than would be possible if it were trained on a smaller amount of training data. However, while the federated learning framework allows user-level data to be maintained on the user's device, the parameter value updates to the machine learning model determined from the local data are oftentimes transmitted outside of the user device (e.g., to the server computing device or another user device), from which user-level information may be trivially recovered or otherwise derived. This is especially undesirable in various situations where different user-level data maintained at the user device is unique, i.e., user-specific, privacy sensitive, or both.

The partially local federated learning framework as described in this specification can allow for additional privacy protection to be provided to such users by adopting, in addition to federated training techniques, local training techniques which allow local training systems implemented directly on user devices to train a subset of model parameters entirely on-device.

Specifically, the described techniques allows for a local training system implemented on a user computing device to maintain a set of local parameters of the machine learning model and updating the values of this set of local parameters entirely within the client computing device by running customizable parameter reconstruction and client update algorithms. By processing the local training data directly and entirely on the user device and refrain from transferring not only the data, but also associated updates to the model parameter values determined from the data elsewhere (e.g., to a cloud computing environment), the protection of the privacy of the user of the device can be improved while using the local training data to train the machine learning model.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
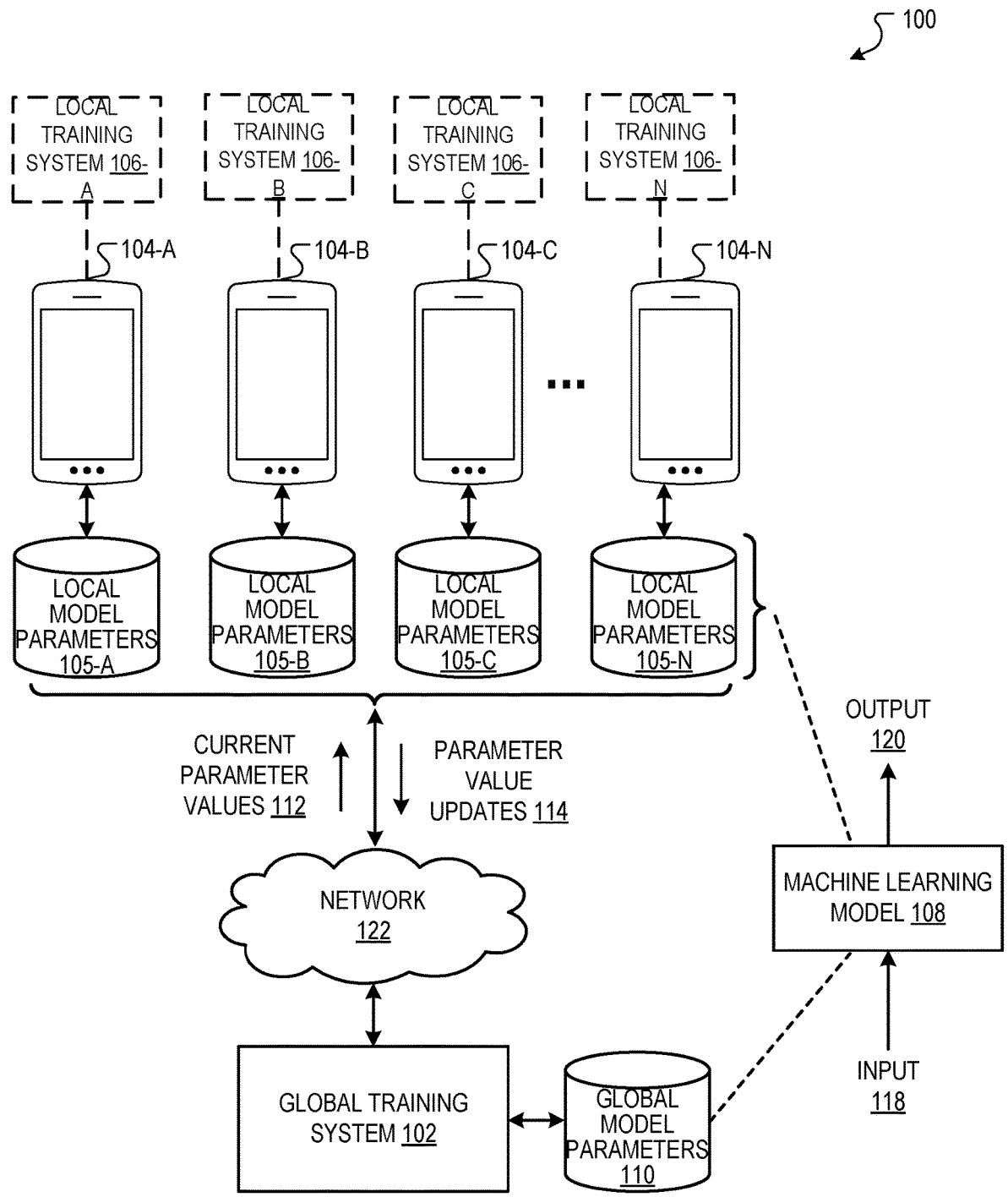
FIG. 1 is a block diagram of an example system.

This specification describes a global training system implemented as computer programs on one or more computers in one or more locations, and local training systems implemented on one or more computers in one or more other locations including on user devices, that can collaboratively train a machine learning model that has a set of global parameters maintained at the global training system and multiple sets of local parameters maintained across the local training systems. As such, the machine learning model may be referred to as a partially local model, because at least a portion of the constituent parameters of the machine learning model, i.e., a set of local parameters, are maintained at a local training system.

To determine updated (e.g., trained) values of the model parameters including the set of global parameters and the multiple sets of local parameters in a manner that respects user privacy, the global training system, together with the local training systems, can train the machine learning model within the context of a federated learning framework while providing additional privacy protection during the training to prevent information that is sensitive, user-specific, or both from being easily recoverable or otherwise derivable outside of the client computing system on which it is stored.

For example, the systems and methods of the present specification can allow for a local dataset, such as a dataset of a single user stored on a user's device, to be used to train a machine-learned model while protecting the privacy of the user's data in the training dataset.

Federated learning is a machine learning framework that enables training of a high-quality centralized model based on training data distributed over a large number of user (or client) computing devices. In federated learning, the training data can be kept locally on users' mobile computing devices (referred to below as "client computing devices") and such client computing devices can be used as nodes for performing computation on their local data in order to update a global model.

Federated learning offers several distinct advantages compared to performing learning at a centralized server. For example, information of the model update may be less sensitive than the data itself. Thus, user data that is privacy sensitive can remain at the user's computing device and need not be uploaded to the server. Rather, only the less sensitive model update can be transmitted. As another advantage, federated learning leverages the computational power of a large number of computing devices (e.g., user mobile devices). In addition, in some implementations, the federated learning framework can be modified to allow for the creation and use of personalized models for each user at their respective device.

However, while the federated learning framework allows user-level data to be maintained on the user's device, in some situations, such user-level data may nonetheless be particularly and uniquely privacy sensitive. For instance, for a machine learning model with user-specific embeddings, such as matrix factorization models for collaborative filtering, training the machine learning model within the context of a conventional federated training framework would involve sending updates to user-specific embeddings that are maintained locally at a client computing device on the server computing device, directly compromising potentially sensitive individual preferences of the user.

The systems and methods according to example aspects of the present specification can allow for additional privacy protection to be provided to such users by maintaining, at a local training system implemented on a user computing device, a set of local parameters of the machine learning model, such as sensitive, user-specific parameters as in the collaborative filtering setting, and updating the values of this set of local parameters entirely within the client computing device during training.

To determine updated parameter values of the machine learning model, the local training system receives, over a data communication network and from the global training system that maintains the set of global (i.e., shared) parameter of the machine learning model, a copy of the set of global parameters and then uses the copy of set of global parameters to obtain a reconstruction of the values of its own local parameters of the machine learning model. The local training system then uses the local parameter values to determine parameter value updates to its copy of the set of global parameters. Reconstructing the local parameter values and updating the global parameter values of the machine learning model at the local training system will be described in more detail below, but in short, they involve running a reconstruction algorithm and a client update algorithm, respectively, over a set of local data that is maintained at the client computing device. The parameter value updates generated by the local training system are transmitted over the data communication network back to the global training system. The global training system uses the parameter value updates generated by the local training system to apply updates to the current values of the set of global parameters of the machine learning model.

FIG. 1 shows an example federated learning environment 100 that includes a global training system 102 and a large number of user devices 104A-N which each implement a respective local training system 106A-N.

The global training system 102 is typically hosted within a data center, which can be a distributed computing system having hundreds or thousands of computers in one or more locations. Each client computing device 104A-N can be, for example, a desktop computer, laptop computer, a tablet computer, a wearable computer, a cellular phone, a smart phone, a music player, an e-book reader, a navigation system, or any other appropriate computing device.

The global training system 102 and the local training systems 106A-N collaboratively train a machine learning model 108. More specifically, the global training system 102 maintains a set of global model parameters 110 of the machine learning model 108, and each local training system, e.g., local training system 106A, maintains a respective set of local model parameters, e.g., the set of local model parameters 105A, of the machine learning model 108. The set of global model parameters 110 and sets of local model parameters 105A-N of the machine learning model 108 are generally different from one another, and each set of the local model parameter is maintained locally at a local training system such that the set of local model parameters is not shared beyond the client computing device.

In some implementations, the set of global model parameters can include non-sensitive or non-user-specific parameters of the machine learning model 108, and the set of local model parameters can include sensitive or user-specific parameters of the machine learning model 108. Non-sensitive or non-user-specific parameters refer to parameters of a portion of the machine learning model 108 that can generate an output, or an intermediate output, e.g., in the form of embeddings, from which the output can be determined, that do not contain sensitive or user-specific information such as user interaction history with the client computing device or individual preferences of the user. In this specification, an embedding is an ordered collection of numeric values that represents an input in a particular embedding space. For example, an embedding can be a data structure, e.g., a vector, of floating point or other numeric values that has a fixed dimensionality. In contrast, sensitive or user-specific parameters refer to parameters of another portion of the machine learning model 108 that can generate an (intermediate) output from which sensitive or user-specific information may be derived or recovered.

The local training systems of the user devices obtain the current values 112 of the set of global model parameters 110 from the global training system 102 and generate parameter value updates 114 to the set of global model parameters 110 using local training data generated on the user devices. The local training systems transmit the parameter value updates 114 to the global training system 102 for use in updating the set of global model parameters 110 of the machine learning model 108.

The machine learning model 108 can have any appropriate machine learning model architecture. For example, the machine learning model 108 may be a neural network model, a random forest model, a support vector machine (SVM) model, a linear model, or a combination thereof.

The machine learning model 108 can be configured through training to perform any kind of machine learning task, i.e., can be configured to receive any kind of digital data input 118 and to generate any kind of score, classification, or regression output 120 based on the input.

In some cases, the machine learning model 108 is a machine learning model that is configured to perform an image processing task, i.e., receive an input image and to process the input image to generate a network output for the input image. For example, the task may be image classification and the output generated by the machine learning model for a given image may be scores for each of a set of object categories, with each score representing an estimated likelihood that the image contains an image of an object belonging to the category. As another example, the task can be image embedding generation and the output generated by the machine learning model can be a numeric embedding of the input image. As yet another example, the task can be object detection and the output generated by the machine learning model can identify locations in the input image at which particular types of objects are depicted. As yet another example, the task can be image segmentation and the output generated by the machine learning model can assign each pixel of the input image to a category from a set of categories.

As another example, if the inputs to the machine learning model are Internet resources (e.g., web pages), documents, or portions of documents or features extracted from Internet resources, documents, or portions of documents, the task can be to classify the resource or document, i.e., the output generated by the machine learning model for a given Internet resource, document, or portion of a document may be a score for each of a set of topics, with each score representing an estimated likelihood that the Internet resource, document, or document portion is about the topic.

As another example, if the inputs to the machine learning model are features of an impression context for a particular advertisement, the output generated by the machine learning model may be a score that represents an estimated likelihood that the particular advertisement will be clicked on.

As another example, if the inputs to the machine learning model are features of a personalized recommendation for a user, e.g., features characterizing the context for the recommendation, e.g., features characterizing previous actions taken by the user, the output generated by the machine learning model may be a score for each of a set of content items, with each score representing an estimated likelihood that the user will respond favorably to being recommended the content item.

As a particular example, the machine learning model can be a collaborative filtering model that is configured to predict the attributes of one user, e.g., the user's preference for an item, based on the attributes of a group of users. For example, given an input including a search query submitted by a given user and a data element, a collaborative filtering model may be used to generate as output an interaction score that characterizes a likelihood that the given user would interact with the data element if the data element were presented to the given user, e.g., on a webpage identified by a search result responsive to the search query. The interaction score can be represented in any appropriate numerical format, for example, as a numerical probability value between 0 and 1.

As another example, if the input to the machine learning model is a sequence of text in one language, the output generated by the machine learning model may be a score for each of a set of pieces of text in another language, with each score representing an estimated likelihood that the piece of text in the other language is a proper translation of the input text into the other language.

As another example, the task may be an audio processing task. For example, if the input to the machine learning model is a sequence representing a spoken utterance, the output generated by the machine learning model may be a score for each of a set of pieces of text, each score representing an estimated likelihood that the piece of text is the correct transcript for the utterance.

As another example, the task may be a keyword spotting task where, if the input to the machine learning model is a sequence representing a spoken utterance, the output generated by the machine learning model can indicate whether a particular word or phrase ("hotword") was spoken in the utterance. As another example, if the input to the machine learning model is a sequence representing a spoken utterance, the output generated by the machine learning model can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As a particular example, the machine learning model can be a next-word-prediction model that is configured to predict the next word in a sequence from one or more preceding words. In this example, the input to the machine learning model can include user inputs on a (touch screen) keyboard of a user device and a word from a vocabulary of words, and the output can include a likelihood score for the word from the vocabulary that characterizes a likelihood that the word will be entered by the user subsequent to the one or more preceding words.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

In the example health prediction task, the machine learning model can also be emotion recognition model which is configured to detect or recognize emotional information of a patient from passive sensor data about the patient's physical state. The passive sensor data can include, e.g., electroencephalogram (EEG) data or electrocardiogram (ECG) data.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

In the example of agent control task, the machine learning model can also be a movement pattern detection model which is configured to detect movement patterns of the agent from sensor data such as accelerometer data.

In some above examples, the machine learning model 108 may in turn include a first sub-model and a second sub-model that each have an appropriate machine learning model architecture, e.g., a neural network model, a random forest model, a support vector machine (SVM) model, or a linear model. In some of these examples, the first sub-model and the second sub-model may be configured to process a same input 118 (or different portions of the same input 118) and to generate different sub-model outputs from which the output 120 can be determined or otherwise derived. In others of these examples, the first sub-model may be configured to process an input 118 to generate a first sub-model output based on the input 118, and the second sub-model may then be configured to receive the first sub-model output and to process the first sub-model output to generate the output 120.

As a particular example, when configured as a collaborative filtering model, the machine learning model 108 can include a query embedding neural network and a data embedding neural network. As described above, the input 118 can include a search query and a data element, and the output 120 can include an interaction score.

The query embedding neural network may be configured to process a search query to generate an embedding of the search query (i.e., a representation of the search query as an ordered collection of numerical values). For example, if the search query is represented by textual data, the query embedding neural network may be a long short-term memory (LSTM) neural network that sequentially processes the characters of the search query to generate the embedding of the search query.

The data embedding neural network may be configured to process a data element (and, optionally, context data) to generate an embedding of the data element (i.e., a representation of the data element as an ordered collection of numerical values). For example, if the data element is a portion of text, the data embedding neural network may be an LSTM neural network that sequentially processes the characters of the portion of text to generate the embedding of the portion of text.

The neural network may generate the interaction score by processing the embedding of the search query generated by the query embedding neural network and the embedding of the data element generated by the data embedding neural network. For example, the neural network may generate the interaction score by taking the inner product of the embedding of the search query and the embedding of the data element. As another example, the neural network may generate the interaction score by processing the embedding of the search query and the embedding of the data element 118 using one or more additional neural network layers.

In this example, the set of local model parameters 105 of the machine learning model 108 may include parameters that define operations performed by the neural network layers of the query embedding neural network. And the set of global model parameters 110 of the machine learning model 108 may include parameters that define operations performed by the neural network layers of the data embedding neural network.

The local training systems 106A-N are each configured to maintain a set of local model parameters 105A-N, e.g., in a logical data storage area or physical data storage device. At each of multiple training iterations, the local training system receives data defining the current values 112 of the set of global model parameters 110 and then uses received data to obtain a reconstruction of the values of its own local model parameters 105 of the machine learning model. The local training system then uses the local parameter values to determine parameter value updates 114 to its copy of the set of global model parameters 110.

The global training system 102 is configured to maintain a set of global model parameters 110, e.g., in a logical data storage area or physical data storage device. At each of multiple training iterations, the global training system uses the parameter value updates 114 generated by the local training systems 106A-N to apply updates to the current values of the set of global parameters 110 of the machine learning model 108.

Generally, the global training system 102 is located remotely from each of the user devices 104A-N (and, by extension, the local training systems 106A-N). The global training system 102 and the user devices 106A-N communicate with one another by transmitting data over the data communication network 122 (e.g., the internet). An example of a local training system is described in more detail with reference to FIG. 2, and an example of a global training system is described in more detail with reference to FIG. 3.

Local data generated on a client computing device refers to data characterizing the interaction of a user of the device. For example, the local data can include webpage history data identified by search results responsive to search queries submitted by the user to a search system. As another example, the local data can include user inputs entered by the user through the (touch screen) keyboard of the client computing device. Generally, some or all of the local data generated on a client computing device may be considered "private". That is, the local data may include information that is personal or sensitive to the user of the device and should not be transferred from the user device in order to respect the privacy of the user. To maintain the privacy of the user, the local training system on a client computing device maintains (e.g., processes or updates) the local data as well as the parameter values of the set of local model parameters 105 on the user device (i.e., without transferring it elsewhere). The parameter value updates 114 that are transmitted from the local training system of the user device to the global training system 102 do not contain raw data or updates to local parameters that could compromise the privacy of the user.

By adjusting the current values of the set of global model parameters 110 using the parameter value updates 114 generated by the local training systems 106A-N of the client computing devices 104A-N, the global training system 102 enables the machine learning model 108 to generate outputs 120 for a particular machine learning task by processing the inputs 118 with greater accuracy.

A client computing device refers to an electronic device that is under control of a user and is capable of transmitting and receiving data over a data communication network (e.g., the internet). Example client computing devices include personal computers, mobile communication devices (e.g., smartphones), personal digital assistants and speech-enabled devices. The client computing devices included in FIG. 1 are depicted as smartphones for illustrative purposes only. In some cases, a client computing device includes user applications (e.g., a web browser) which facilitate transmitting and receiving data. In particular, client applications included in a client computing device enable the client computing device to transmit search queries to a search system, and to receive search results provided by the search system in response to the search queries.

In contrast to a local training system residing on a client computing device, the global training system 102 can be implemented by one or more computers located in one or more locations. For example, the global training system 102 may be hosted within a data center, which can be a distributed computing system having hundreds or thousands of computers in one or more locations.

Additionally or alternatively, in the case of cross-silo federated learning or data center federated learning, each of some or all of the local training systems 106A-N can also be implemented by one or more computers located in one or more other locations different from where the global training system 102 is implemented. That is, instead of or in addition to being a portable electronic device such as a personal computer, each client computing device can also be a data center, or one or more constituent computing devices of a data center. In cross-silo federated learning, different organizations, e.g., different financial or medical organizations, can apply federated learning to train a model together by using local data that is private to each organization. In data center federated learning, training data is split by a user and federated learning is applied at the data center as a way of achieving better privacy during training of the model.

Figure 2:
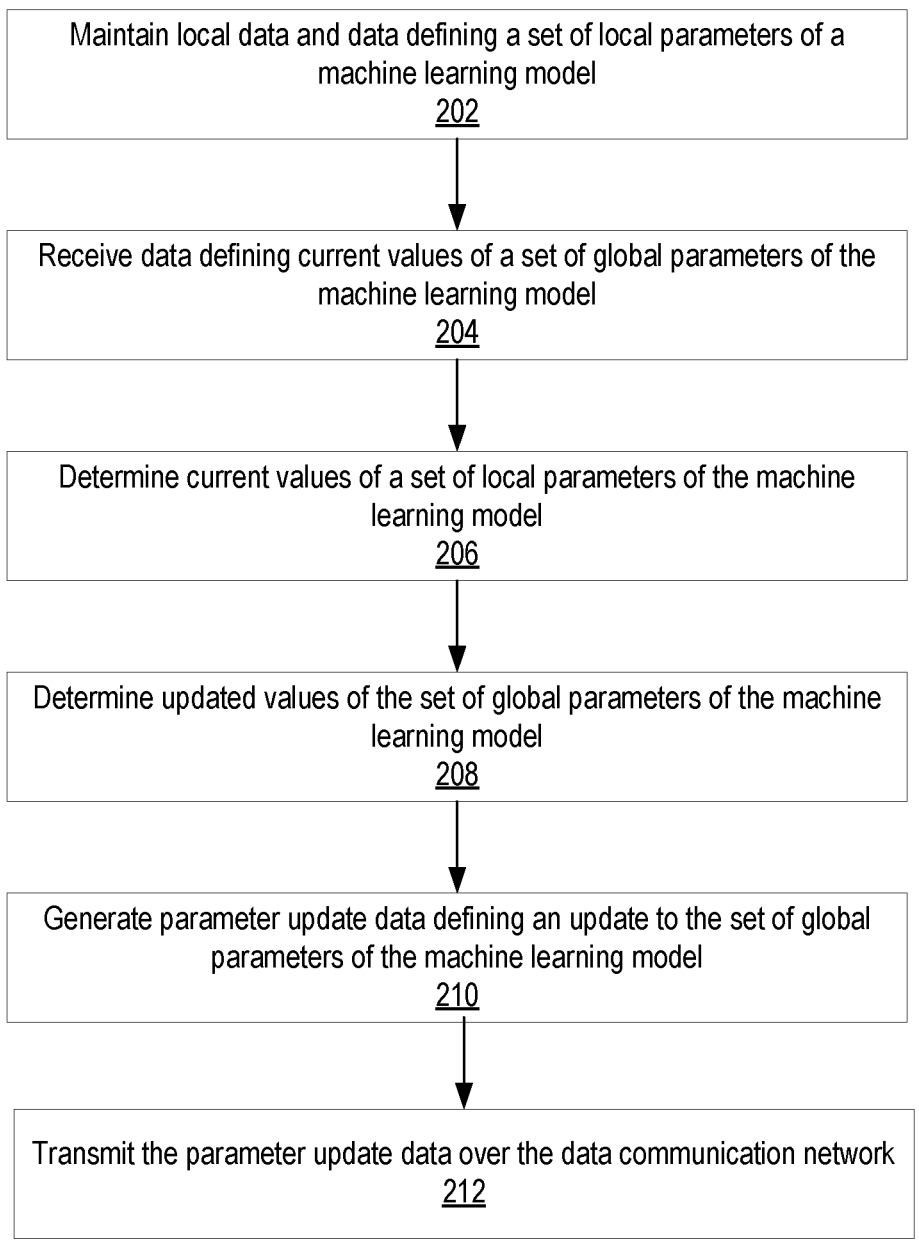
FIG. 2 is a flow diagram of an example process for generating parameter update data for a machine learning model using a local training system.

FIG. 2 is a flow diagram of an example process 200 for generating parameter update data for a machine learning model using a local training system. For convenience, the process 200 will be described as being performed by a system of one or more computers located in one or more locations. For example, a local training system, e.g., the local training systems 106A-N of FIG. 1, appropriately programmed in accordance with this specification, can perform the process 200.

The system maintains local data and data defining a set of local parameters of a machine learning model (202). The machine learning model can be any appropriate machine learning model having a set of trainable global model parameters and a set of trainable local model parameters that can be iteratively trained on local data maintained at the client computing device running the system.

The local data is a proper subset of a plurality of proper subsets of data that are used to train the machine learning model, where each proper subset of data is maintained on a separate client computing device, and is used to train the machine learning model only on the client computing device on which the proper subset is maintained.

In some implementations, the local data can include a first dataset ("support dataset") for reconstruction and a second dataset ("query dataset") for global parameter updates. For example, the system can run a dataset split function over data that has been generated locally at the user device, e.g., as a result of recent user interaction with the user device, to partition the data into the support dataset and the query dataset. For example, the system can repeatedly (i.e., at each of multiple time steps) use the dataset split function to randomly divide recent local data into the support dataset and the query dataset that are of equal size to each other.

In some implementations, the system continually generates training examples for training the machine learning model based on the local data, i.e., based on either support dataset or query dataset, and both before and after receiving the current global model parameter values of the machine learning model. Each training example generated by the system can include a machine learning model training input and a target output that should be generated by the machine learning model to perform a particular machine learning task by processing the training input.

The system receives, from a global training system running at a server computing device and over a data communication network, data defining current values of a set of global parameters of the machine learning model over the data communication network (204). Optionally, the data defining the current parameter values of the set of global model parameters may be compressed, encrypted, or both, and the system can decompress and decrypt the received data as necessary.

The system determines, based on (i) the local data, (ii) the set of local model parameters, and (iii) the current values of the set of global model parameters, current values of the set of local model parameters of the machine learning model (206). The current values of the set local model parameters are typically different from the current values of the global model parameters.

To do this, the system provides the support dataset, data defining the set of local model parameters, and the data defining the current values of the set of global model parameters as input to a reconstruction algorithm. For example, running the reconstruction algorithm can involve determining initialized values of the set of local model parameters, and then performing one or more steps of gradient descent (e.g., stochastic gradient descent) on the initialized values of the set of local parameters using the support dataset in accordance with a reconstruction learning rate $\eta_r$.

In this example, assuming the system performs a total of $k_r \geq 1$ steps of gradient descent, at each step, the system can compute:

$$l_i^{(t,1)} = l_i^{(t,0)} - \eta_r \nabla_{l_i} f_i(g^{(t)} \| l_i^{(t,0)})$$
$$l_i^{(t,2)} = l_i^{(t,1)} - \eta_r \nabla_{l_i} f_i(g^{(t)} \| l_i^{(t,1)})$$
$$\ldots$$
$$l_i^{(t)} = l_i^{(t,k_r)} = l_i^{(t,k_r-1)} - \eta_r \nabla_{l_i} f_i(g^{(t)} \| l_i^{(t,k_r-1)}),$$

where $g^{(t)}$ denotes the current values of the global model parameters, and $l_i^{(t,k_r-1)}$ denotes the values of the set of local model parameters as of the current step, with $l_i^{(t,0)}$ denoting the randomly initialized values of the set of local model parameters. $f_i(x) = \mathbb{E}_{\xi \in D_i}[(f_i(x, \xi)]$ is an objective function used by the system to evaluate a measure of performance of the machine learning model on the particular task, where x is the combination (e.g., concatenation ∥) of the global model parameters g and set of the local model parameters l, and $\xi$ is a training example generated from the support dataset. Specifically, for a given training example, the system can evaluate the objective function to measure a difference between (i) a training output generated by processing the training input using the machine learning model in accordance with current values of the global and local model parameters and (ii) the target output.

For example, the objective function can be a cross-entropy objective function or a squared-error objective function, and different systems running at different client computing devices can use different objective functions. Optionally, in order to incentivize the set of local model parameters trained in this way to not diverge too far from the corresponding set of global parameters, an additional regularization term that penalizes any difference between local and global parameter values may be added to the objective function.

As another example of suitable reconstruction algorithms, the system can determine the current values of the set of local model parameters by analytically computing a reconstruction formula that solves for the values of the set of local model parameters in closed form, i.e., instead of using gradient updates. For example, the system can determine the current values of the set of local model parameters of the machine learning model by running an alternating minimization algorithm over (i) the local data, (ii) the set of local model parameters, and (iii) the current values of the set of global model parameters. In the setting of matrix factorization, the alternating minimization algorithm can be used to solve for local model parameters while global model parameters are frozen, in alternating steps with solving for the global model parameters while the local model parameters are frozen.

Figure 4:
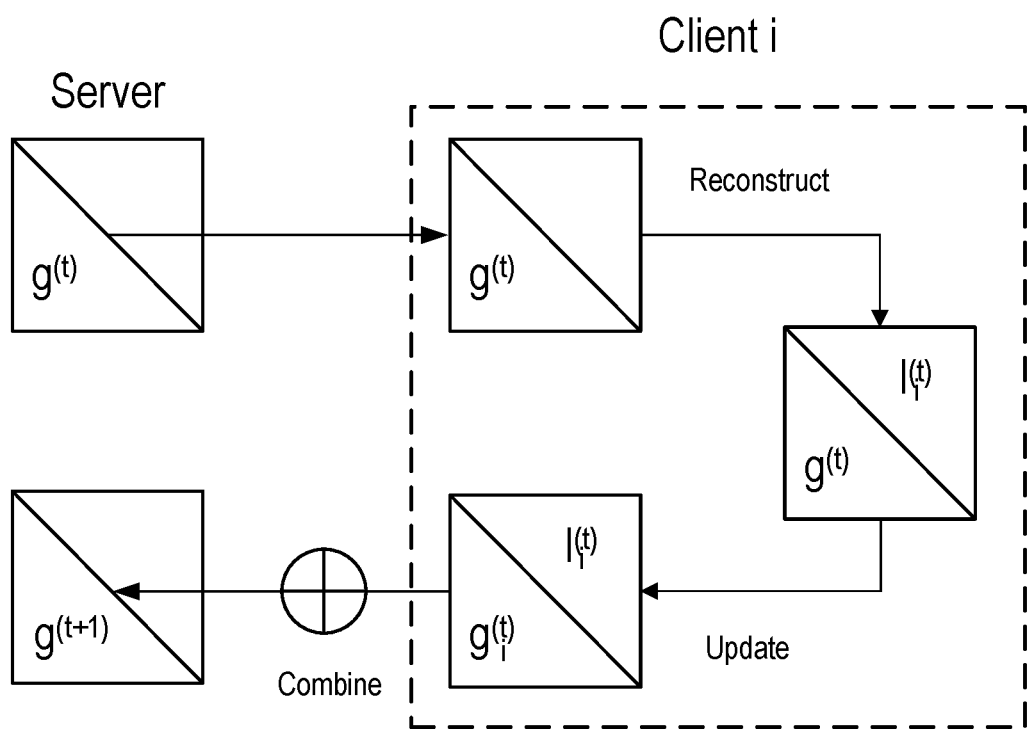
FIG. 4 is an example illustration of federated reconstruction.

FIG. 4 is an example illustration of federated reconstruction. As illustrated in the upper side of FIG. 4, a client computing device receives a copy of the current values of the set of global model parameters $g^{(t)}$ from the server computing device, and generates current values of the set of local model parameters of the machine learning model $l_i^{(t)}$ based on the current values of the set of global model parameters.

The system determines, based on (i) the local data, (ii) the current values of the set of local model parameters, and (iii) the current values of the set of global model parameters, updated values of the set of global model parameters of the machine learning model (208).

To do this, the system provides the query dataset, data defining the current values of the set of local model parameters, and the data defining the current values of the set of global model parameters as input to an update algorithm. For example, running the update algorithm can involve performing one or more steps of gradient descent on the current values of the set of global model parameters using the query dataset in accordance with a client update learning rate $\eta_u$.

In this example, assuming the system performs $k_u=1$ step of gradient descent, the system can compute:

$$(g^{(t)} - \eta_u \nabla_g f_i(g^{(t)} \| l_i^{(t)})) - g^{(t)}),$$

where $g^{(t)}$ denotes the current values of the global model parameters, and $l_i^{(t)}$ denotes the values of the set of local model parameters as determined from step 206. $f_i(x) = \mathbb{E}_{\xi \in D_i}[(f_i(x, \xi)]$ is the objective function used by the system to evaluate a measure of performance of the machine learning model on the particular task, where x is the combination (e.g., concatenation ∥) of the global model parameters g and set of the local model parameters l, and $\xi$ is a training example generated from the query dataset.

The system generates, based on the updated values of the set of global model parameters, parameter update data defining an update to the set of global model parameters of the machine learning model (210). In some implementations, to generate the parameter update data, the system can compute a difference between the current values of the set of global model parameters and the updated values of the set of global model parameters. In some implementations, the system additionally generates a weighting factor to be associated with the update to the set of global parameters based on a size of the local data maintained at the client computing device. For example, the system can determine the value of the weighting factor in proportion to a number of training examples generated from the query dataset.

The system transmits, to the global training system running at the server computing device, the parameter update data over the data communication network (212). The parameter update data includes the update to the set of global model parameters and, in some implementations, the weighting factor associated with the update. Optionally, the system may compress the parameter update data, encrypt the parameter update data, or both, before transmitting it to the global training system.

As illustrated in the bottom side of FIG. 4, the client computing device generates updated values of the set of global model parameters of the machine learning model $g_i^{(t)}$ and transmits the parameter update data defining an update to the set of global model parameters of the machine learning model to the server computing device, which then uses the parameter update data received from the client computing device to generate updated values of the global model parameters of the machine learning model $g^{(t+1)}$.

Figure 3:
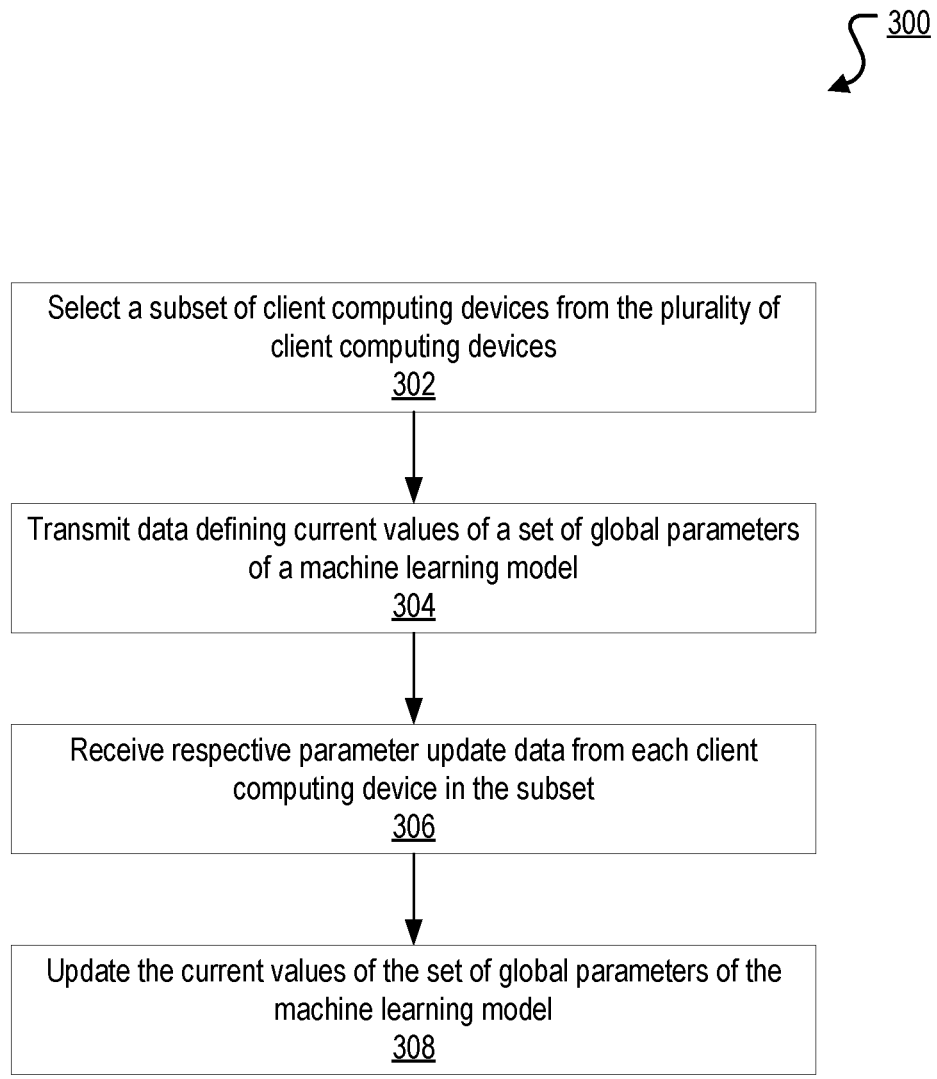
FIG. 3 is a flow diagram of an example process for updating the global parameter values of a machine learning model using a global training system.

FIG. 3 is a flow diagram of an example process 300 for updating the global parameter values of a machine learning model using a global training system. For convenience, the process 300 will be described as being performed by a system including hardware and software components located on a user device. For example, a global training system, e.g., the global training system 102 of FIG. 1, appropriately programmed in accordance with this specification, can perform the process 300.

The system selects a subset of client computing devices from the plurality of client computing devices (302). For example, the system can make this selection with uniform randomness or some other advanced client selection techniques that are, e.g., dependent on network stability or computation resource availability or both of the client computing devices.

The system transmits, to each client computing device in the subset and over the data communication network, data defining current values of a set of global parameters of a machine learning model (304). As described above, the machine learning model has the set of global parameters maintained at the server computing device on which the system runs, and a plurality of sets of local parameters maintained across the plurality of the client computing devices. In some implementations, the system may transmit a representation of the current values of the set of global model parameters of the machine learning model that is compressed, encrypted, or both.

The system receives, from each client computing device in the subset and over the data communication network, respective parameter update data defining an update to the set of global model parameters of the machine learning model (306). In some implementations, the parameter update data received from a client computing device defines an adjustment to the current parameter values of the set of global model parameters of the machine learning model. In other implementations, the parameter update data received from a client computing device directly defines updated parameter values of the set of global model parameters of the machine learning model. The parameter update data received from a user device may be compressed, encrypted, or both. The system can decompress and decrypt the parameter update data receive from a user device as necessary.

The system updates the current values of the set of global model parameters of the machine learning model based on the respective parameter update data (308). For example, the system can combine, e.g., by computing an unweighted or weighted average of, the parameter update data received from each of the client computing devices, scale the combined parameter update data by a server learning rate $\eta_s$, and add the result to the current values of the set of global model parameters of the machine learning model.

In some implementations, instead of combining all of the parameter update data that has been received, the system combines only the parameter update data received from certain client computing devices that each maintain more than a threshold amount of local data. This can stabilize the training.

An example algorithm for federated reconstruction training is shown below.

---
Algorithm 1 Federated Reconstruction Training
---

Input: set of global parameters $\mathcal{G}$, set of local parameters
$\mathcal{L}$, dataset split function S, reconstruction algorithm R,
client update algorithm U
Server executes:
    $g^{(0)} \leftarrow$ (initialize $\mathcal{G}$)
    for each round t do
        $S^{(t)} \leftarrow$ (randomly sample m clients)

-continued

Algorithm 1 Federated Reconstruction Training for each client $i \in S^{(t)}$ in parallel do
   $(\Delta_i^{(t)}, n_i) \leftarrow$ ClientUpdate(i, $g^{(t)}$)
end for $n = \sum_{i \in S^{(t)}} n_i$ $g^{(t+1)} \leftarrow g^{(t)} + \eta_s \sum_{i \in S^{(t)}} \frac{n_i}{n} \Delta_i^{(t)}$ end for
ClientUpdate:
   $(D_{i,s}, D_{i,q}) \leftarrow S(D_i)$
   $l_i^{(t)} \leftarrow R(D_{i,s}, \mathcal{L}, g^{(t)})$
   $g_i^{(t)} \leftarrow U(D_{i,q}, l_i^{(t)}, g^{(t)})$
   $\Delta_i^{(t)} \leftarrow g_i^{(t)} - g^{(t)}$
   $n_i \leftarrow |D_{i,q}|$
   return $\Delta_i^{(t)}, n_i$ to the server In the example algorithm shown above, for each training iteration t, the global training system transmits the current values of the global model parameters $g^{(t)}$ to each local training system that has been selected by using a random sampling function.

At each selected local training system i, the local training system applies a dataset split function S to its local data $D_i$ to split it into a support dataset $D_{i,s}$ to be used for reconstruction, and a query dataset $D_{i,q}$ to be used for updating global model parameters. The local training system uses (i) the support dataset $D_{i,s}$ and (ii) the global model parameters $g^{(t)}$ (in accordance with their current values) as inputs to a reconstruction algorithm R to generate the current values of the local model parameters $l_i^{(t)}$. The local training system then uses the query dataset $D_{i,q}$, the local model parameters $l_i^{(t)}$ (in accordance with their current values), and the global model parameters $g^{(t)}$ (in accordance with their current values) as inputs to the update algorithm U to generate updated values for the global model parameters $g_i^{(t)}$.

To combine the updates to global model parameters received from the selected local training systems, the global training system uses the combined global model parameter updates as an "antigradient" that can be input into a gradient-based optimization function, e.g., a stochastic gradient descent function. In the example algorithm, the global training system determines the aggregated global model parameter updates by determining a weighted average of the updates transmitted by different local training systems, where the weight is computed as $n_i = |D_{i,q}|$.

The processes 200 and 300 can be repeatedly performed by the local and global training systems, respectively, for any of a number of training iterations, and in a either synchronous or asynchronous manner. In synchronous training, the global training system only uses parameter value updates generated by a local training system with respect to the current values of the model parameters to adjust the current values of the model parameters. In asynchronous training, the global training system may use parameter value updates generated by a local training system with respect to previous values of the model parameters to adjust the current values of the model parameters.

In some implementations, the local training system can instantiate an instance of the machine learning model with trained parameters, e.g., by making use of the parameter values generated as a result of the federated reconstruction training process, or generated by fine-tuning the parameter values generated as a result of the federated reconstruction training process, and then use the trained machine learning model to perform the particular machine learning task by processing new inputs, e.g., inputs generated as a result of user interaction with the client computing device, e.g., inputs entered by the user through the (touch screen) keyboard of the client computing device. That is, the local training system can receive inputs to be processed, use the trained machine learning model to process the inputs, and provide the outputs generated by the trained machine learning model or data derived from the generated outputs in response to the received inputs. For example, the local training system can do this after the processes 200 and 300 have been performed for a predetermined number of iterations, or for a predetermined period of time.

In addition or instead, the local training system can output data specifying the trained parameters and, optionally, architecture data that specifies the architecture of machine learning model to another local system, e.g., an inference system, that runs on the same client computing device so that the other local system can instantiate an instance of the trained machine learning model and then use the trained machine learning model to perform the particular machine learning task by processing new inputs.

Specifically, to instantiate an instance of the machine learning model, the local training system can similarly follow the reconstruction techniques applied during training, i.e., by receiving a copy of the global model parameters from the global training system and then using it to determine, in accordance with the trained values of the global model parameters and the local data maintained at the client computing device, the trained values of its own local model parameters. The system can collectively use the set of global model parameters and the set of local model parameters to generate the instance of the trained machine learning model.

In some implementations, the local model parameters maintained at a client computing device may overlap with part or all of the global model parameters, and the local training system running on the client computing device may instantiate an instance of the machine learning model by aggregating, e.g., by computing an average or summation of, the set of local parameters with the corresponding part of global model. In the case where the local training system is unable to initialize its local parameters, e.g., due to limited compute or data that is available to the client computing device, the local training system can instead use the fully global model and skip the aggregation, i.e., instantiate the instance of the machine learning model based entirely on set of global model parameters.

In some implementations, different local training systems running at different client computing devices can generate multiple instances of the trained machine learning model that are (at least partially) different from one another, because each local training system can maintain a different set of local data, including data generated as a result of user interaction with the client computing device.

In some implementations, a local training system that may be "unseen" (i.e., not selected even once) during the federated reconstruction training process can still use the set of global model parameters and its own local data to generate an instance of the trained machine learning model to perform the particular machine learning task with satisfactory accuracy.

In some implementations, instantiation of the instance of the trained machine learning model can be performed entirely offline, and independently from the federated reconstruction training process, such that a local training system can perform reconstruction once and store the local model parameters for repeated use, optionally refreshing them periodically as new local data becomes available or accessible to the client computing device.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by a client computing device that is in data communication with a server computing device over a data communication network, the method comprising:

maintaining local data and data defining a set of local parameters of a machine learning model, wherein the local data is a proper subset of a plurality of proper subsets of data that are used to train the machine learning model, each proper subset of data maintained on a separate client computing device, and is used to train the machine learning model only on the client computing device on which the proper subset is maintained;

receiving, from the server computing device, data defining current values of a set of global parameters of the machine learning model over the data communication network;

after receiving the data defining current values of the set of global parameters, but prior to training the set of global parameters of the machine learning model, determining, based on i) a support dataset that is a subset of the local data maintained at the client computing device that is excluded from being used for training the set of global parameters of the machine learning model, ii) the set of local parameters, and iii) the current values of the set of global parameters, current values of the set of local parameters of the machine learning model, the current values of the set local parameters being different from the current values of the global parameters;

after determining the current values of the set of local parameters of the machine learning model, training the set of global parameters of the machine learning model based on i) a query dataset that is another subset of the local data maintained at the client computing device that is used for training the set of global parameters of the machine learning model, ii) the current values of the set of local parameters, and iii) the current values of the set of global parameters to determine updated values of the set of global parameters of the machine learning model, the query dataset being different from the support dataset;

generating, based on a difference between the current values of the set of global parameters and the updated values of the set of global parameters, parameter update data that does not contain updates to the set of local parameters of the machine learning model and thus precludes recovery of the local data maintained at the client computing device from the parameter update data, and wherein the parameter update data defines an update to the set of global parameters of the machine learning model; and transmitting, to the server computing device, the parameter update data over the data communication network.

2. The method of claim 1, wherein maintaining local data further comprises partitioning the local data into the support dataset and the query dataset in accordance with a dataset split function.

3. The method of claim 2, wherein determining the current values of the set of local parameters of the machine learning model comprises:

providing the support dataset, the set of local parameters, and the data defining the current values of the set of global parameters as input to a reconstruction algorithm.

4. The method of claim 3, wherein determining the current values of the set of local parameters of the machine learning model further comprises:

determining initialized values of the set of local parameters; and performing one or more steps of gradient descent on the initialized values of the set of local parameters using the support dataset in accordance with a reconstruction learning rate n".

5. The method of claim 3, wherein the reconstruction algorithm comprises an alternating minimization algorithm.

6. The method of claim 2, wherein determining the updated values of the set of local parameters of the machine learning model comprises:

providing the query dataset, data defining the current values of the set of local parameters, and the data defining the current values of the set of global parameters as input to an update algorithm.

7. The method of claim 6, wherein determining the updated values of the set of local parameters of the machine learning model further comprises:

performing one or more steps of gradient descent on the current values of the set of global parameters using the query dataset in accordance with a client update learning rate $\eta_u$.

8. The method of claim 1, wherein generating the parameter update data further comprises generating a weighting factor to be associated with the update to the set of global parameters based on a size of the local data.

9. The method of claim 1, further comprising:

generating a local instance of the machine learning model from trained values of the sets of global and local parameters of the machine learning model; and using the local instance of the machine learning model to perform a machine learning task locally at the client computing device.

10. A method performed by a server computing device that is in data communication with a plurality of client computing devices over a data communication network, the method comprising:

selecting a subset of client computing devices from the plurality of client computing devices;

transmitting, to each client computing device in the subset and over the data communication network, data defining current values of a set of global parameters of a machine learning model, wherein the machine learning model has the set of global parameters maintained at the server computing device and a plurality of sets of local parameters maintained at the plurality of the client computing devices;

receiving, from each client computing device in the subset and over the data communication network, respective parameter update data defining an update to the set of global parameters of the machine learning model, wherein the respective parameter update data received from each client computing device does not contain updates to the set of local parameters of the machine learning model and thus precludes recovery of local data maintained at the client computing device from the respective parameter update data, and wherein the respective parameter update data is generated by each client computing device based on:

after receiving the data defining current values of the set of global parameters, but prior to training the set of global parameters of the machine learning model, determining, based on i) a support dataset that is a subset of the local data maintained at the client computing device that is excluded from being used for training the set of global parameters of the machine learning model, ii) the set of local parameters, and iii) the current values of the set of global parameters, the current values of the set of local parameters of the machine learning model, the current values of the set local parameters being different from the current values of the global parameters; and after determining the current values of the set of local parameters of the machine learning model, training the set of global parameters of the machine learning model based on i) a query dataset that is another subset of the local data maintained at the client computing device that is used for training the set of global parameters of the machine learning model, ii) the current values of the set of local parameters, and iii) the current values of the set of global parameters to determine updated values of the set of global parameters of the machine learning model, the query dataset being different from the support dataset; and updating the current values of the set of global parameters of the machine learning model based on the respective parameter update data.

11. The method of claim 10, wherein updating the current values of the set of global parameters of the machine learning model comprises:

combining the updates to the set of global parameters of the machine learning model in accordance with weighting factors defined the respective parameter update data.

12. The method of claim 10, wherein updating the current values of the set of global parameters of the machine learning model comprises:

combining only the updates to the set of global parameters of the machine learning model received from client computing devices that each maintain more than a threshold amount of local data.

13. The method of claim 10, wherein updating the current values of the set of global parameters of the machine learning model comprises:

determining an update to the current values of the set of global parameters in accordance with a server learning rate ns.

14. A system comprising a client computing device that is in data communication with a server computing device over a data communication network, the client computing device comprising one or more computers and one or more storage devices storing instructions that when executed by the one or more computers cause the one or more computers to perform operations comprising:

maintaining local data and data defining a set of local parameters of a machine learning model, wherein the local data is a proper subset of a plurality of proper subsets of data that are used to train the machine learning model, each proper subset of data maintained on a separate client computing device, and is used to train the machine learning model only on the client computing device on which the proper subset is maintained;

receiving, from the server computing device, data defining current values of a set of global parameters of the machine learning model over the data communication network;

after receiving the data defining current values of the set of global parameters, but prior to training the set of global parameters of the machine learning model, determining, based on i) a support dataset that is a subset of the local data maintained at the client computing device that is excluded from being used for training the set of global parameters of the machine learning model, ii) the set of local parameters, and iii) the current values of the set of global parameters, current values of the set of local parameters of the machine learning model, the current values of the set local parameters being different from the current values of the global parameters;

after determining the current values of the set of local parameters of the machine learning model, training the set of global parameters of the machine learning model based on i) a query dataset that is another subset of the local data maintained at the client computing device that is used for training the set of global parameters of the machine learning model, ii) the current values of the set of local parameters, and iii) the current values of the set of global parameters to determine updated values of the set of global parameters of the machine learning model, the query dataset being different from the support dataset;

generating, based on a difference between the current values of the set of global parameters and the updated values of the set of global parameters, parameter update data that does not contain updates to the set of local parameters of the machine learning model and thus precludes recovery of the local data maintained at the client computing device from the parameter update data, and wherein the parameter update data defines an update to the set of global parameters of the machine learning model; and transmitting, to the server computing device, the parameter update data over the data communication network.

15. The system of claim 14, wherein maintaining local data further comprises partitioning the local data into the support dataset and the query dataset in accordance with a dataset split function.

16. The system of claim 15, wherein determining the current values of the set of local parameters of the machine learning model comprises:

providing the support dataset, the set of local parameters, and the data defining the current values of the set of global parameters as input to a reconstruction algorithm.

17. The system of claim 16, wherein determining the current values of the set of local parameters of the machine learning model further comprises:

determining initialized values of the set of local parameters; and performing one or more steps of gradient descent on the initialized values of the set of local parameters using the support dataset in accordance with a reconstruction learning rate $\eta_r$.

18. The system of claim 15, wherein determining the updated values of the set of local parameters of the machine learning model comprises:

providing the query dataset, data defining the current values of the set of local parameters, and the data defining the current values of the set of global parameters as input to an update algorithm.

19. The system of claim 18, wherein determining the updated values of the set of local parameters of the machine learning model further comprises:

performing one or more steps of gradient descent on the current values of the set of global parameters using the query dataset in accordance with a client update learning rate $\eta_u$.

20. The system of claim 14, wherein the operations further comprise:

generating a local instance of the machine learning model from trained values of the sets of global and local parameters of the machine learning model; and using the local instance of the machine learning model to perform a machine learning task locally at the client computing device.

21. One or more non-transitory computer-readable storage media storing instructions that when executed by one or more computers cause the one or more computers to perform operations comprising:

maintaining, at a client computing device that is in data communication with a server computing device over a data communication network, local data and data defining a set of local parameters of a machine learning model, wherein the local data is a proper subset of a plurality of proper subsets of data that are used to train the machine learning model, each proper subset of data maintained on a separate client computing device, and is used to train the machine learning model only on the client computing device on which the proper subset is maintained;

receiving, from the server computing device, data defining current values of a set of global parameters of the machine learning model over the data communication network;

after receiving the data defining current values of the set of global parameters, but prior to training the set of global parameters of the machine learning model, determining, based on i) a support dataset that is a subset of the local data maintained at the client computing device that is excluded from being used for training the set of global parameters of the machine learning model, ii) the set of local parameters, and iii) the current values of the set of global parameters, current values of the set of local parameters of the machine learning model, the current values of the set local parameters being different from the current values of the global parameters;

after determining the current values of the set of local parameters of the machine learning model, training the set of global parameters of the machine learning model based on i) a query dataset that is another subset of the local data maintained at the client computing device that is used for training the set of global parameters of the machine learning model, ii) the current values of the set of local parameters, and iii) the current values of the set of global parameters to determine updated values of the set of global parameters of the machine learning model, the query dataset being different from the support dataset;

generating, based on a difference between the current values of the set of global parameters and the updated values of the set of global parameters, parameter update data that does not contain updates to the set of local parameters of the machine learning model and thus precludes recovery of the local data maintained at the client computing device from the parameter update data, and wherein the parameter update data defines an update to the set of global parameters of the machine learning model; and transmitting, to the server computing device, the parameter update data over the data communication network.

22. The method of claim 1, wherein the parameter update data does not include data that defines the current values of the set local parameters of the machine learning model.

23. The method of claim 10, wherein the respective parameter update data received from each client computing device does not include data that defines the current values of the set local parameters of the machine learning model.

24. The system of claim 14, wherein the parameter update data does not include data that defines the current values of the set local parameters of the machine learning model.

25. The non-transitory computer-readable storage media of claim 21, wherein the parameter update data does not include data that defines the current values of the set local parameters of the machine learning model.

* * * * *